United States Patent
Alam et al.

(10) Patent No.: US 10,800,392 B2
(45) Date of Patent: Oct. 13, 2020

(54) BRAKE HEALTH INDICATOR SYSTEMS USING INPUT AND OUTPUT ENERGY

(71) Applicant: The Boeing Company, Chicago, IL (US)

(72) Inventors: Shahriar Alam, Chandler, AZ (US); Daniel D. Gilbertson, St. Louis, MO (US); James Schimert, Seabeck, WA (US)

(73) Assignee: The Boeing Company, Chicago, IL (US)

( * ) Notice: Subject to any disclaimer, the term of this patent is extended or adjusted under 35 U.S.C. 154(b) by 533 days.

(21) Appl. No.: 15/489,877

(22) Filed: Apr. 18, 2017

(65) Prior Publication Data

US 2018/0297573 A1      Oct. 18, 2018

(51) Int. Cl.
*B60T 8/17* (2006.01)
*F16D 66/02* (2006.01)
(Continued)

(52) U.S. Cl.
CPC .......... *B60T 17/221* (2013.01); *B60T 8/1703* (2013.01); *B60T 17/22* (2013.01); *B64F 5/60* (2017.01);
(Continued)

(58) Field of Classification Search
CPC .. B60T 17/22; B60T 17/221; B60T 2270/413; B60T 8/1703; B64C 25/42;
(Continued)

(56) References Cited

U.S. PATENT DOCUMENTS 4,790,606 A * 12/1988 Reinecke ............... B60T 8/00
                                                  188/1.11 E
4,845,468 A *  7/1989 Stark ..................... F16D 55/40
                                                      340/454
(Continued)

FOREIGN PATENT DOCUMENTS

DE      10105638 A1      8/2002
DE      20208841 U1 *    8/2002  .......... G01M 17/007
(Continued)

OTHER PUBLICATIONS

Partial European Search Report dated Jul. 31, 2018 issued in European Patent Application No. 18157763.6 (European counterpart of the instant U.S. patent application).
(Continued)

*Primary Examiner* — Charles J Han
(74) *Attorney, Agent, or Firm* — Ostrager Chong Flaherty & Broitman P.C.

(57) ABSTRACT

Systems and methods for indicating the health of brakes on an aircraft or a ground vehicle. One method for monitoring brake health calculates the ratio of input energy to output energy during braking. The input energy is a function of commanded brake force and speed. The output energy may be measured by measuring the increase in temperature or the actual brake force over time during brake application. When using brake temperatures, the temperatures in a pair of brakes may optionally be compared. If the respective measured temperatures of the two brakes differ by an amount that exceeds a specified threshold, the system produces an indication that one brake may require repair or replacement. Variability due to operational and environmental factors that affect measured temperature can be reduced by comparing the measured brake temperatures for one brake with selected
(Continued)

brake temperature data collected from the same brake during other landings under similar conditions.

14 Claims, 7 Drawing Sheets

(51) Int. Cl.
*B64F 5/60* (2017.01)
*F16D 66/00* (2006.01)
*B60T 17/22* (2006.01)
*B64C 25/42* (2006.01)

(52) U.S. Cl.
CPC ........ *F16D 66/02* (2013.01); *B60T 2270/413* (2013.01); *B64C 25/42* (2013.01); *F16D 2066/001* (2013.01); *F16D 2066/005* (2013.01)

(58) Field of Classification Search
CPC ................. B64F 5/60; F16D 2066/001; F16D 2066/005; F16D 66/02
See application file for complete search history.

(56) References Cited

U.S. PATENT DOCUMENTS

| | | | |
|---|---|---|---|
| 5,909,171 A | * | 6/1999 | Kyrtsos ................... F16D 66/00 116/208 |
| 7,618,100 B2 | | 11/2009 | Griffith et al. |
| 8,712,634 B2 | | 4/2014 | Followell et al. |
| 2016/0305501 A1 | | 10/2016 | Rehfus et al. |
| 2016/0318497 A1 | | 11/2016 | Wright et al. |

FOREIGN PATENT DOCUMENTS

| | | |
|---|---|---|
| DE | 20208841 U1 | 8/2002 |
| EP | 2060456 A1 | 5/2009 |
| EP | 3048018 A1 | 7/2016 |
| RU | 2284274 C2 | 9/2006 |
| WO | 2012045953 A1 | 4/2012 |

OTHER PUBLICATIONS

Extended European Search Report dated Nov. 6, 2018 issued in European Patent Application No. 18157763.6 (European counterpart of the instant U.S. patent application).

\* cited by examiner

BRAKE HEALTH INDICATOR SYSTEMS USING INPUT AND OUTPUT ENERGY

BACKGROUND

This disclosure generally relates to brake systems. In particular, this disclosure relates to systems and methods for monitoring the health of brakes.

Vehicles, particularly commercial air and land vehicles, typically include some type of performance monitoring system that records data regarding the vehicle performance, which includes the performance of the various components of the vehicle, such as a fault in one of the vehicle subsystems. The data includes a record of certain performance events that occur during the operation of the vehicle. The performance monitoring system typically conducts data collection and reports all of the data collected to the user. The user then may utilize the data in determining the type of maintenance, if any, that the vehicle may need. For example, if the data indicates that a particular component of the vehicle is anomalous, then the user can perform appropriate maintenance on the vehicle at the next opportunity.

For example, brakes in the form of stacked discs frequently comprise material that wears with use, which wear decreases the thickness of the brake discs and the height of the stack. Worn brake discs are replaced when wear exceeds a predetermined amount. To detect brake disc wear, it is known to utilize linear variable differential transformer (LVDT) sensors, which electronically measure the distance between the brake stack and the brake housing to calculate brake disc wear.

In cases of excessive wear or other sub-standard conditions, a brake on an aircraft or other vehicle may become overheated during operation. In the particular case of an aircraft, when a braking system has hot brake issues, the result may be a costly flight interruption. It would be desirable to provide brake health indicators to forewarn an operator, who may then take appropriate action to avoid an unscheduled interruption of service.

SUMMARY

The subject matter disclosed in detail below is directed to systems and methods for indicating the wear/degradation/health (hereinafter collectively referred to as "brake health") of brakes, such as brakes on an aircraft or a ground vehicle. A method for monitoring brake health is proposed herein in which the ratio of input energy to output energy during braking is calculated. The input energy is a function of commanded brake force and speed. The output energy may be estimated using any one of a plurality of methods. In the case of aircraft, the methods proposed herein provide insight into the health of the braking system, allowing an airline operator to perform a cost-effective preventative maintenance, thereby improving the operational reliability of the aircraft.

The output energy can be measured by measuring the increase in temperature over time during brake application. In accordance with other embodiments, the output energy can be measured by measuring the actual brake force over time during brake application. When using brake temperatures, it may be desirable to reduce variability due to operational and environmental factors that affect measured temperature.

In accordance with one example embodiment that uses temperature, the temperatures in a pair of similar brakes are compared. The respective measured temperatures during dual brake application should be the same if both brakes are in the same operational state (e.g., if both are healthy). If the respective measured temperatures of the two similar brakes differ by an amount that exceeds a specified threshold, the system produces a flag that one of the two brakes may be a candidate for repair or replacement. As used herein, the term "flag" should be construed broadly to encompass any of the following: an analog signal, a digital code, a report, a notice, an alert or a warning.

In accordance with some embodiments disclosed herein, variability due to operational and environmental factors is reduced by comparing the measured brake temperatures for one brake with selected brake temperature data collected from the same brake during other landings under similar conditions.

In accordance with some embodiments disclosed herein, brake health indicator values are calculated using recorded flight data augmented with other operational and environmental data. This takes advantage of how the relationship between input versus output energy signatures varies due to braking system degradations. Operational and environmental data are used to help normalize and increase the fidelity of the calculated energy signatures.

Although various embodiments of systems and methods for indicating brake health are disclosed below, one or more of those embodiments may be characterized by one or more of the following aspects.

One aspect of the subject matter disclosed in detail below is a method for monitoring health of a brake on a vehicle, comprising: (a) generating brake force command data representing brake force commands; (b) applying brake forces to the brake in response to the brake force commands; (c) generating groundspeed data representing measurements of groundspeed of the vehicle during application of brake forces; (d) generating brake data representing measurements of a condition of the brake during application of brake forces; (e) collecting the brake force command data, groundspeed data and brake data onboard the vehicle to form collected data; (f) transmitting the collected data to a computer system that is configured to perform steps (g), (h) and (i); (g) calculating a current value of a brake health indicator that is a ratio of a brake input energy to a brake output energy based on the collected data; (h) determining whether the current value of the brake health indicator is outside a range of expected values or not; and (i) generating a flag in response to a determination in step (h) that the current value of the brake health indicator is outside the range of expected values. The expected values may be are derived from historical brake condition data acquired under similar landing conditions for the same brake or similar brakes. The foregoing method may further comprise the following steps: (j) performing an inspection of the brake following generation of the flag; (k) determining whether the brake should be repaired or replaced or not based on results of the inspection; and (l) repairing or replacing the brake following a determination that the brake should be repaired or replaced.

In accordance with some embodiments, the method further comprises calculating a brake input energy and measuring a brake output energy, wherein calculating the current value of the brake health indicator comprises calculating a ratio of the calculated brake input energy and the measured brake output energy. In turn, calculating the brake input energy comprises calculating a sum over time of a product of a measured groundspeed of the vehicle and a commanded brake force during application of brake forces. In cases where the brake condition is brake temperature, measuring the brake output energy comprises measuring a first brake temperature at a time before application of brake forces and measuring a second brake temperature at a time after application of brake forces. This method may further comprise removing the effect of other factors that also affect temperature. In cases where the brake condition is brake force, measuring the brake output energy comprises summing a product of a groundspeed of the vehicle and a brake force over time during application of brake forces.

Another aspect of the subject matter disclosed in detail below is a method for monitoring health of brakes on a vehicle, comprising: (a) generating brake force command data representing brake force commands; (b) applying brake forces to first and second brakes in response to the brake force commands; (c) generating first thermal energy data representing an amount of thermal energy produced by the first brake during application of brake forces; (d) generating second thermal energy data representing an amount of thermal energy produced by the second brake during application of brake forces; (e) collecting the first and second thermal energy data onboard the vehicle to form collected temperature data; (f) transmitting the collected first and second thermal energy data to a computer system that is configured to perform steps (g), (h) and (i); (g) calculating a current value of a brake health indicator that is a ratio of the amounts of thermal energy respectively produced by the first and second brakes during application of brake forces; (h) determining whether the current value of the brake health indicator is outside a range of expected values or not; and (i) generating a flag in response to a determination in step (h) that the current value of the brake health indicator is outside the range of expected values.

In accordance with some embodiments, the first thermal energy data comprises first brake temperature data representing a temperature change in the first brake during application of brake forces, the second thermal energy data comprises second brake temperature data representing a temperature change in the second brake during application of brake forces, and calculating the current value of the brake health indicator comprises calculating a ratio of the temperature change in the first brake and the temperature change in the second brake. This method may further comprise removing the effect of other factors that also affect temperature. The expected values may be derived from historical brake condition data acquired under similar landing conditions for the same brake or similar brakes.

A further aspect of the subject matter disclosed in detail below is a system for monitoring health of a brake on a vehicle, comprising a computer system configured to perform the following operations: receiving brake force command data, vehicle groundspeed data and brake condition measurement data; calculating a current value of a brake health indicator that is a ratio of a calculated brake input energy and a measured brake output energy based on the received data; determining whether the current value of the brake health indicator is outside a range of expected values or not; and generating a flag in response to a determination that the current value of the brake health indicator is outside the range of expected values. In accordance with some embodiments, the computer system is further configured to calculate the brake input energy by calculating a sum over time of a product of measured groundspeed of the vehicle and commanded brake force during application of brake forces. In one proposed example implementation, the brake condition measurement data comprises a first brake temperature measured at a time before application of brake forces and a second brake temperature measured at a time after application of brake forces. In another proposed example implementation, the brake condition measurement data comprises brake force measured during application of brake forces, and measuring the brake output energy comprises summing a product of measured groundspeed of the vehicle and measured brake force over time during application of brake forces.

Yet another aspect is a system for monitoring health of brakes on a vehicle, comprising a computer system configured to perform the following operations: receiving first thermal energy data representing an amount of thermal energy produced by a first brake during application of brake forces; receiving second thermal energy data representing an amount of thermal energy produced by a second brake during application of brake forces; calculating a current value of a brake health indicator that is a ratio of the amounts of thermal energy respectively produced by the first and second brakes during application of brake forces; determining whether the current value of the brake health indicator is outside a range of expected values or not; and generating a flag in response to a determination that the current value of the brake health indicator is outside the range of expected values. In one proposed example implementation, the first thermal energy data comprises first brake temperature data representing a temperature change in the first brake during application of brake forces, the second thermal energy data comprises second brake temperature data representing a temperature change in the second brake during application of brake forces, and calculating the current value of the brake health indicator comprises calculating a ratio of the temperature change in the first brake and the temperature change in the second brake.

Other aspects of systems and methods for monitoring brake health are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 3 indicates the relationship between FIGS. 3A and 3B, which figures in conjunction form a flowchart identifying steps of a process for monitoring the health of brakes on a vehicle in accordance with one advantageous embodiment.

FIG. 4 indicates the relationship between FIGS. 4A and 4B, which figures in conjunction form a flowchart identifying steps of a process for monitoring the health of brakes on a vehicle in accordance with another advantageous embodiment.

Reference will hereinafter be made to the drawings in which similar elements in different drawings bear the same reference numerals.

DETAILED DESCRIPTION

Illustrative embodiments are described below as they might be employed onboard an aircraft. However, it should be appreciated that the apparatus and methods described below have wider application and may be used in other types of wheeled vehicles having braking systems. In the interest of clarity, not all features of an actual implementation are described in this specification. A technician skilled in the art will appreciate that in the development of any such actual embodiment, numerous implementation-specific decisions must be made to achieve the developer's specific goals, which may vary from one implementation to another.

Various embodiments of systems for monitoring the health of brakes on a vehicle will now be described in detail with reference to the drawings for the purpose of illustration. Some alternative embodiments may employ all or less than all of the features to be described below.

The embodiments disclosed in some detail below may be described in terms of functional and/or logical block components and various processing steps. It should be appreciated that such block components may be realized by any number of hardware, software, and/or firmware components configured to perform the specified functions. For example, some embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that some embodiments may be practiced in conjunction with a variety of different aircraft brake systems and aircraft configurations, and that the systems described herein are merely examples.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the drawings are intended to represent example functional relationships and/or physical couplings between the various elements. It should be noted that many alternative or additional functional relationships or physical connections may be present in alternative embodiments.

The example aircraft described herein employs an electric brake system, which may be powered by any suitable power supply, such as an active aircraft power supply that is operational when the aircraft engine(s) are running or a main aircraft battery. The electric brake system in turn may comprise multiple electric braking subsystems, each electric braking subsystem being associated with respective main landing gears of an aircraft. In the example given below, each main landing gear has a respective wheel group comprising two fore wheels and two aft wheels arranged in a rectangular configuration. Depending on which side of the aircraft the main landing gear is located, the left fore wheel and left aft wheel may be disposed either inboard or outboard with respect to the right fore wheel and right aft wheel. The terms "left" and "right" refer to the port and starboard of the aircraft, respectively. In practice, the left and right electric brake subsystems may be independently controlled in the manner described below.

Figure 1:
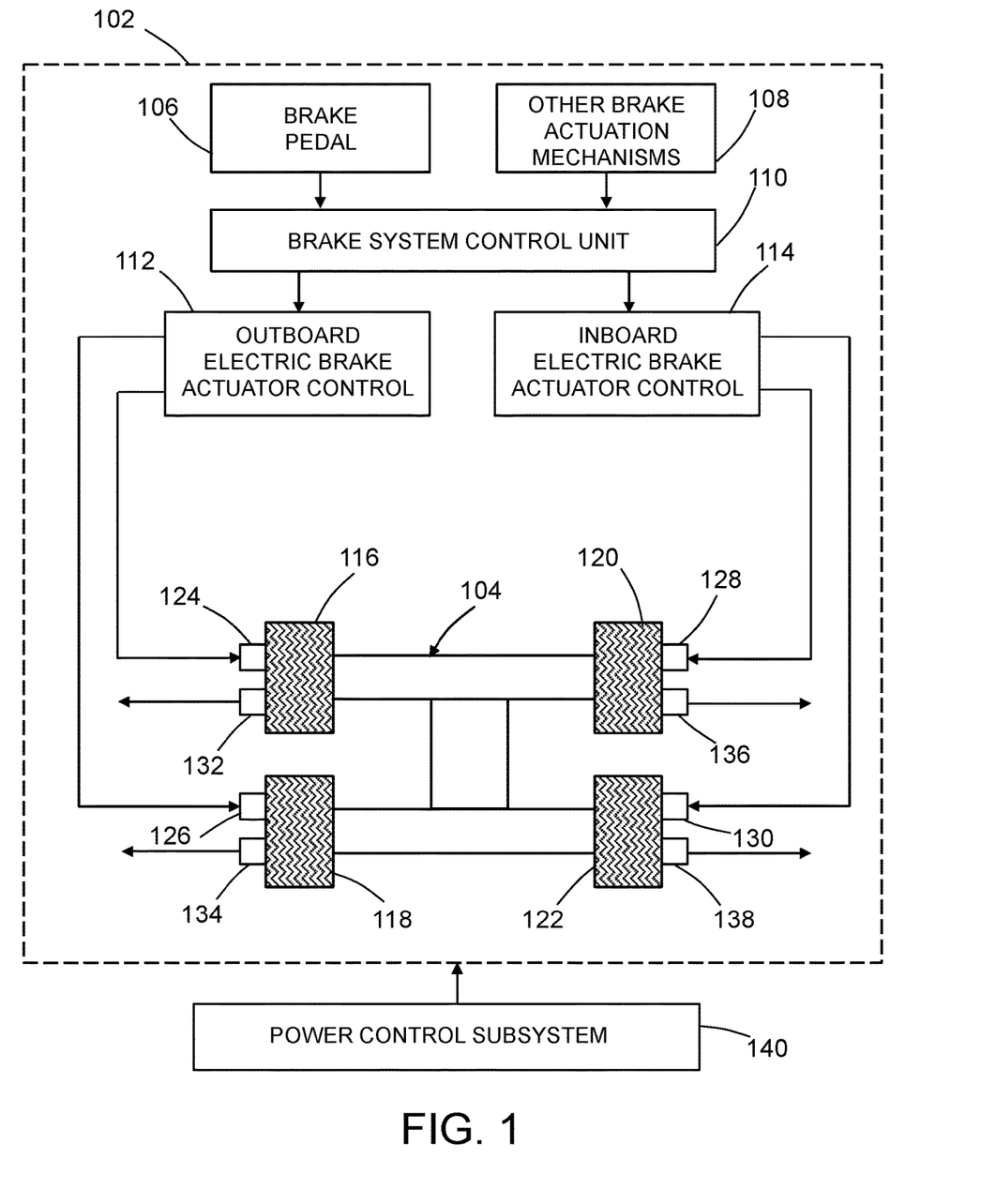
FIG. 1 is a block diagram identifying some components of a typical electric brake system for an aircraft.

FIG. 1 is a schematic representation of an example embodiment of an electric brake system 102 for an aircraft. The aircraft may employ left and right electric brake subsystems which are similarly configured to have the architecture depicted in FIG. 1. For this example, each of the left and right electric brake subsystems comprises the following components: a brake pedal 106; other brake actuation mechanisms 108; a brake system control unit (BSCU) 110 coupled to brake pedal 106 and to the other brake actuation mechanisms 108; an outboard electric brake actuator controller (EBAC) 112 coupled to BSCU 110; an inboard EBAC 114 coupled to BSCU 110; an outboard wheel group that includes a fore wheel 116 and an aft wheel 118 rotatably coupled to respective axles of an undercarriage bogie 104; an inboard wheel group that includes a fore wheel 120 and an aft wheel 122 rotatably coupled to respective axles of the undercarriage bogie 104; electric brake mechanisms 124, 126 operatively coupled to fore and aft wheels 116, 118 respectively and electrically coupled to EBAC 112; electric brake mechanisms 128, 130 operatively coupled to fore and aft wheels 120, 122 respectively and electrically coupled to EBAC 114; remote data concentrators 132, 134 operatively coupled to fore and aft wheels 116, 118 respectively; and remote data concentrators 136, 138 operatively coupled to fore and aft wheels 120, 122 respectively. Each electric brake mechanism comprises a wheel brake and an electric brake actuator that is controlled by the respective EBAC.

The elements of the electric brake system 102 can be coupled together using a data communication bus or any suitable interconnection arrangement. For example, a digital data communication bus or buses may be configured to communicate EBAC control signals from BSCU 110 to the EBACs, to communicate brake mechanism control signals (e.g., actuator control signals) from the EBACs to the electric brake actuators, etc. Briefly, BSCU 110 reacts to manipulation of brake pedal 106 and generates control signals that are received by EBACs 112, 114. In turn, EBACs 112, 114 generate brake mechanism control signals that are received by electric brake mechanisms 124, 126, 128, 130. In turn, the wheel brakes engage to impede or prevent rotation of the respective wheels.

BSCU 110 is an electronic control unit that has embedded software that digitally computes EBAC control signals that represent braking commands. BSCU 110 monitors various aircraft inputs to provide control functions. For example, BSCU 110 obtains pilot command control signals from brake pedal 106, along with additional command control signals from other brake actuation mechanisms 108. BSCU 110 may also receive wheel data (e.g., wheel speed, rotational direction, tire pressure, etc.) from remote data concentrators 132, 134, 136, 138. BSCU 110 processes its input signals and generates one or more EBAC control signals that are received by EBACs 112, 114. Each EBAC 112, 114 receives EBAC control signals from BSCU 110, processes the EBAC control signals, and generates the brake mechanism control signals (brake actuator signals) for its associated electric brake mechanisms in response to the respective EBAC control signals generated by BSCU 110. In this manner, EBACs 112, 114 control the electric brake actuators to apply, release, modulate, and otherwise control the application of the wheel brakes.

The electric brake system 102 depicted in FIG. 1 is coupled to a suitably configured power control subsystem 140. Power control subsystem 140 may be coupled to BSCU 110, to EBACs 112, 114 and/or to other components of electric brake system 102. In this embodiment, power control subsystem 140 is suitably configured to provide, apply, remove, switch, or otherwise regulate the operating power for the electric brake mechanisms and/or the electric brake actuators as needed.

Figure 2:
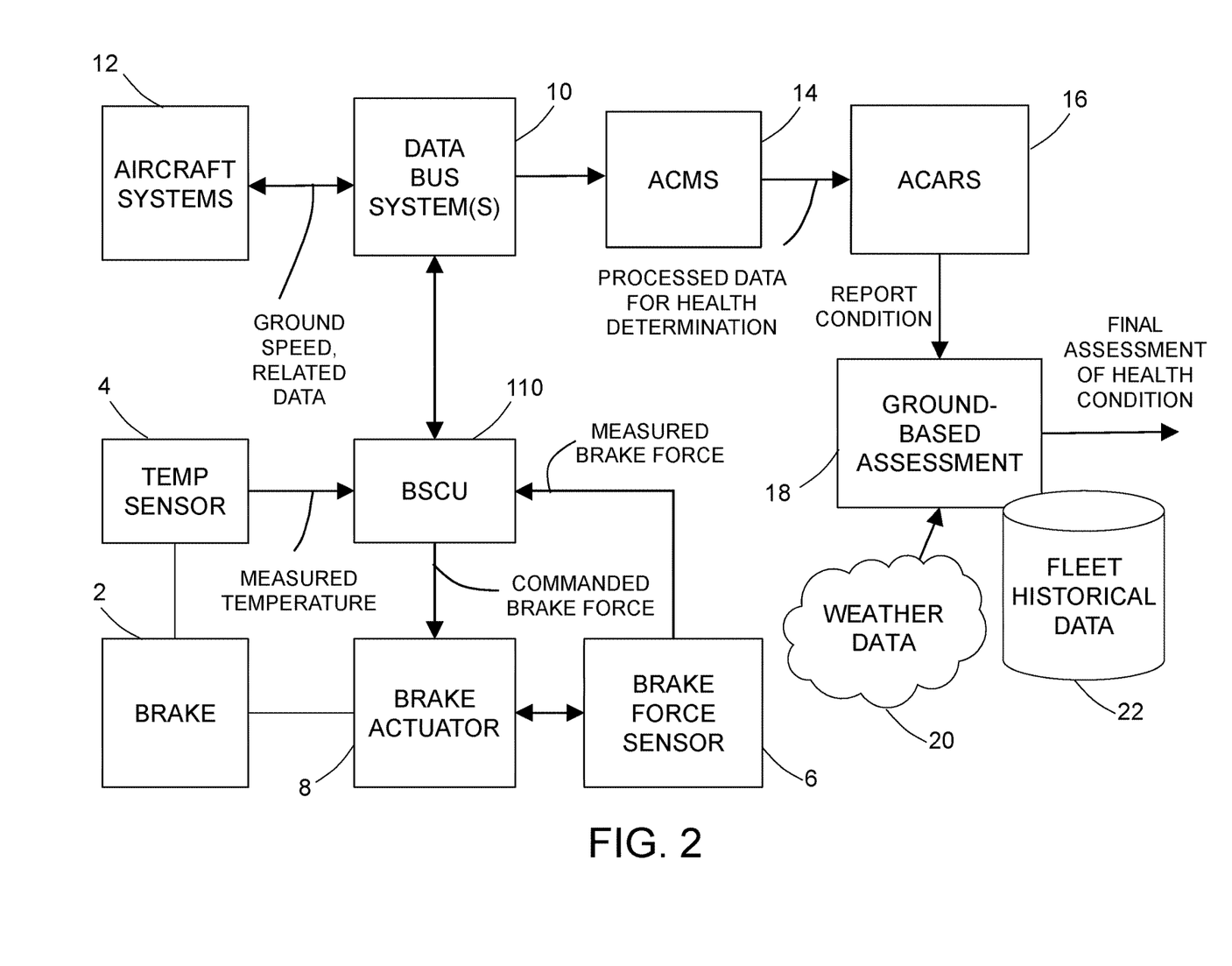
FIG. 2 is a block diagram identifying some components of a brake health monitoring system in accordance with one embodiment.

FIG. 2 is a block diagram identifying some components of a brake health monitoring system in accordance with one embodiment. This brake health monitoring system may be used to monitor the health of the wheel brakes of the electric brake system 102 depicted in FIG. 1, brakes of other electric brake systems having configurations different than what is depicted in FIG. 1, or brakes of non-electric brake systems.

The methods of monitoring brake health will be described hereinafter with reference to a typical wheel brake on a landing gear of an aircraft. In accordance with the example embodiment depicted in FIG. 2, brake 2 is of a type that operates by friction in response to the application of a brake force. The brake force is applied by a brake actuator 8 in response to a brake force command received from a brake system control unit (BSCU) 110.

As the brake force is exerted, the friction produces heat that causes the temperature of the brake 2 to increase. A temperature sensor 4 is operatively coupled to measure the temperature of brake 2 over time during application of brake forces. The temperature sensor 4 outputs electrical signals representing the measured brake temperature. The temperature sensor 4 may be incorporated in a line replaceable unit (LRU).

In addition or in the alternative, a brake force sensor 6 is operatively coupled to the brake actuator 8 for measuring the surface normal brake force being applied to brake 2. There are a different implementations of brake force sensors such as a resolver to measure brake piston position or a load cell to measure normal force. In any case the brake force sensor device electro-mechanics allow for the BSCU to get a reading from the device and convert that data into the measured brake force. The measured brake force data generated by brake force sensor 6 may be used to calculate brake output energy in an alternative embodiment (discussed below). The brake force sensor 6 may be incorporated in a LRU.

The BSCU 110 receives the data representing the measured brake temperature from the temperature sensor 4 and the data representing the measured brake force from the brake force sensor 6 and transmits that data to a data bus system 10. In addition, the BSCU 110 transmits electrical signals representing the commanded brake force to the data bus system. The aircraft further comprises an aircraft system 12 configured to generate electrical signals representing a measured ground speed of the aircraft and related data and transmit that data to the data bus system 10. The data transmitted to the data bus system 10 may be broadcast to all units connected to data bus system 10 in accordance with a communications protocol (e.g., the controller area network communications protocol). One such unit is an aircraft condition monitoring system (ACMS) 14.

The ACMS 14 is a computer system configured to collect, monitor, record and report real-time aircraft system data. For example, other data collected by the ACMS 14 is used to perform cabin pressure and temperature monitoring, hard landing detection, flight crew monitoring, and engine monitoring in addition to many other aircraft performance functions. The reported data is then utilized to analyze aircraft performance and trends in aircraft performance, report significant flight events, and troubleshoot faults. Although the functions of the ACMS 14 may be implemented in software running on a general purpose computer, other embodiments may be implemented in software residing on customized processors or LRUs.

The ACMS 14 is further configured to output processed data to a digital datalink system for transmission of messages between aircraft and ground stations. In accordance with the example embodiment depicted in FIG. 2, the digital datalink system is the Aircraft Communications Addressing and Reporting System (ACARS) 16. ACARS is a system for transmission of data messages between aircraft and ground stations via radio (VHF or HF) or satellite. ACARS messages are transmitted to and from aircraft before, during and after flights. ACARS is used to send information about the conditions of various aircraft systems and sensors in real-time. For example, the aircraft sends in-flight reports on position, altitude, speed, outside temperature, wind, fuel, engine performance, etc. over ACARS. Maintenance faults and abnormal events are also transmitted to ground stations along with detailed messages, which are used for monitoring brake health and planning repair and maintenance activities. The system automatically selects the communication means based on available links and avionics selection policies, which may take into consideration factors such as cost, performance and availability. In accordance with one embodiment, the ACARS 16 comprises an avionics computer called an ACARS Management Unit (MU), which is directly interfaced to a Control Display Unit in the cockpit. There is a datalink interface between the ACARS MU and the flight management system. An ACARS message typically comprises a header containing an aircraft identifier, a payload containing aircraft calculated and measured data (in the present case, brake condition data) and a cyclic redundancy check.

Referring again to FIG. 2, the ACARS 16 broadcasts brake condition reports, which are received by a radio transceiver (not shown in FIG. 2). The radio transceiver is managed by a ground-based computer system called an Arinc Front End Processor System (not shown in FIG. 2), which handles and routes messages. In the instant case, brake condition reports from ACARS 16 are routed to a ground-based brake health assessment computer system 18. The brake health assessment computer system 18 is configured to process the data in the received brake condition reports using one or more of the brake health monitoring algorithms disclosed below and generate a final assessment of the health of brake 2. Optionally, the brake health assessment computer system 18 is further configured to use weather data 20 and fleet historical data 22 in the course of assessing the health of brake 2.

The weather data 20 may include ground weather information collected from weather sources, such as, for example, without limitation, the National Oceanic and Atmospheric Administration. More specifically, ground weather information may include information about weather local to a particular operation center, including meteorological conditions pertinent to a particular landing at a particular time and place, such as precipitation, temperature, wind speed and direction.

The fleet historical data 22 comprises historical brake condition data for a fleet of aircraft, including ranges of expected values of various brake health indicators. Such ranges of expected values are determined based on historical values of brake health indicators for the same brake or similar brakes that were in acceptable condition at the time when those historical values were acquired.

Figure 2A:
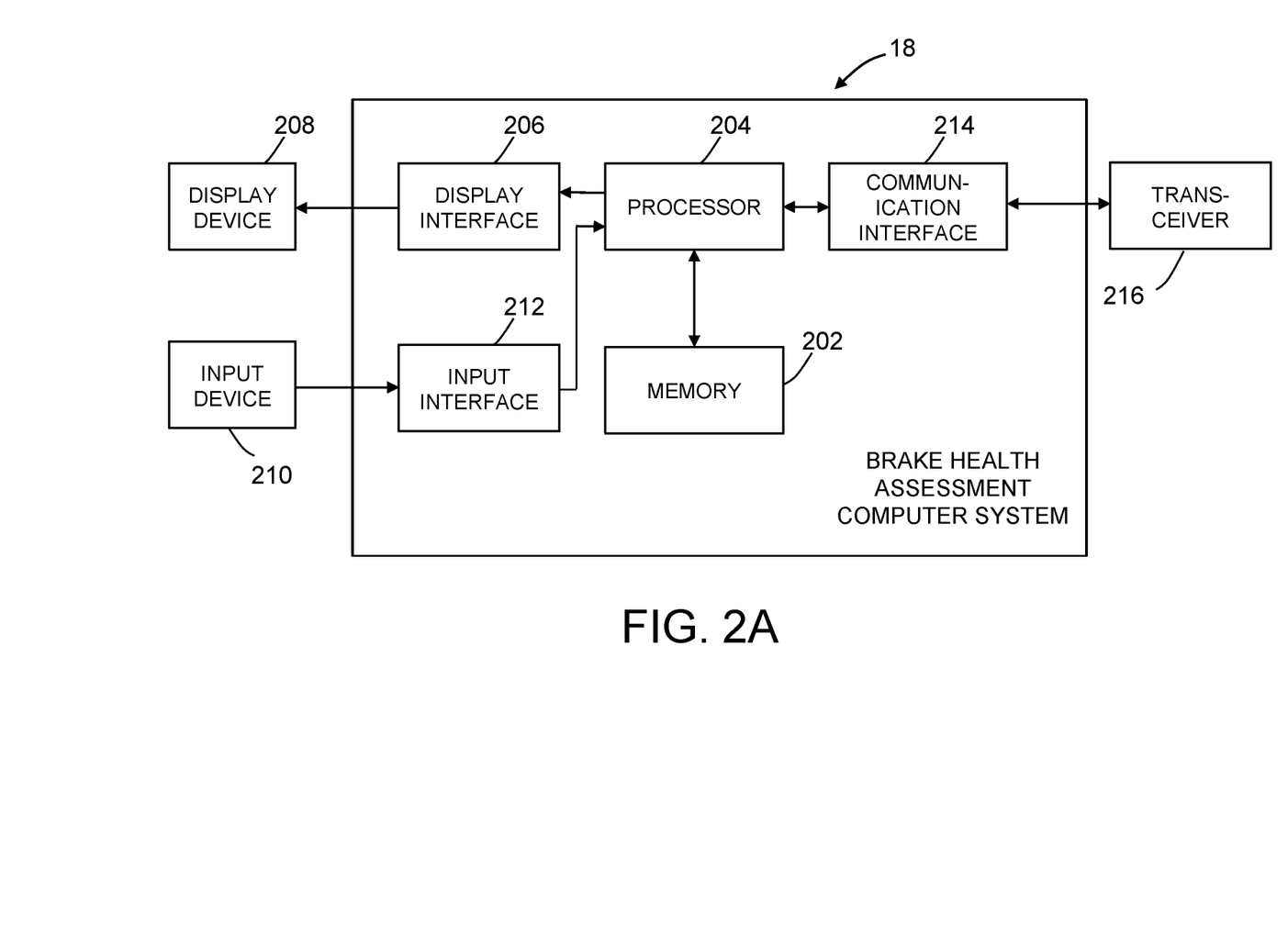
FIG. 2A is a block diagram identifying components of a brake health assessment computer system in accordance with one embodiment.

FIG. 2A is a block diagram identifying components of a brake health assessment computer system 18 suitable for executing the brake health monitoring algorithms disclosed in detail below. In accordance with one embodiment, the brake health assessment computer system 18 comprises a memory device 202 and a processor 204 coupled to memory device 202 for use in executing instructions. More specifically, the brake health assessment computer system 18 configurable to perform one or more operations described herein by programming memory device 202 and/or processor 204. For example, processor 204 may be programmed by encoding an operation as one or more executable instructions and by providing the executable instructions in memory device 202.

Processor 204 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller, an application specific integrated circuit, and other programmable circuits.

The memory device 202 includes one or more devices (not shown) that enable information such as executable instructions (such as brake health monitoring algorithms) and/or other data to be selectively stored and retrieved. In the exemplary embodiment, such data may include, but is not limited to, historical brake condition data, brake condition reports, weather data, aircraft data (including, for example, groundspeed data), modeling data, imaging data, and operational data. In the exemplary embodiment, the brake health assessment computer system 18 is configured to use any algorithm and/or method that enables the methods and systems to function as described herein. Memory device 202 may also include one or more non-transitory tangible computer-readable storage media, such as, without limitation, dynamic random access memory, static random access memory, a solid state disk, and/or a hard disk.

In the exemplary embodiment, the brake health assessment computer system 18 further comprises a display interface 206 that is coupled to processor 204 for use in presenting information to a user. For example, display interface 206 may include a display adapter (not shown) that may couple to a display device 208, such as, without limitation, a cathode ray tube, a liquid crystal display, a light-emitting diode (LED) display, an organic LED display, an "electronic ink" display, and/or a printer.

The brake health assessment computer system 18, in the exemplary embodiment, further comprises an input interface 212 for receiving input from the user. For example, in the exemplary embodiment, input interface 212 receives information from an input device 210 suitable for use with the methods described herein. Input interface 212 is coupled to processor 204 and to input device 210, which may include, for example, a joystick, a keyboard, a pointing device, a mouse, a stylus, a touch sensitive panel (e.g., a touch pad or a touch screen), and/or a position detector.

In the exemplary embodiment, the brake health assessment computer system 18 further comprises a communication interface 214 that is coupled to processor 204. In the exemplary embodiment, communication interface 214 communicates with at least one remote device, e.g., a transceiver 216. For example, communication interface 214 may use, without limitation, a wired network adapter, a wireless network adapter, and/or a mobile telecommunications adapter. A network (not shown) used to couple the brake health assessment computer system 18 to the remote device may include, without limitation, the Internet, a local area network (LAN), a wide area network, a wireless LAN, a mesh network, and/or a virtual private network or other suitable communication means.

In accordance with the various embodiments of a brake health monitoring system disclosed herein, the brake health assessment computer system 18 is configured (e.g., by means of executable instructions embodied in a non-transitory tangible computer-readable storage medium, including, without limitation, a storage device and/or a memory device) to perform a brake health monitoring algorithm. Various brake health monitoring algorithms, which estimate brake input energy using the commanded brake force and measured speed of the aircraft, will now be described in some detail. In some of the brake health monitoring algorithms disclosed below, the output energy of the brake is estimated by measuring a change in brake temperature during a time interval. In other brake health monitoring algorithms, the output energy of the brake is estimated by measuring the brake force applied over time. A first brake health monitoring algorithm is designed for monitoring a single brake. A second brake health monitoring algorithm compares the temperatures in a pair of similar brakes. A third brake health monitoring algorithm compares the measured brake temperatures for one brake with selected brake temperature data collected from the same brake during other landings under similar conditions.

In accordance with one method that uses the first brake health monitoring algorithm, the long-term health of a single brake is determined by relating a calculated braking energy (i.e., the input energy) to a measured thermal energy (i.e., the output energy). This method utilizes real system measured parameters related to the amount of thermal energy generated during a braking process. The work done by a brake to slow an aircraft is converted into thermal energy through the brake frictional force. The amount of work done by a brake is approximately proportional to the measured change in temperature during the braking process. More specifically, the amount of work done by a brake is approximately proportional to the difference between first and second temperature measurement, wherein the first temperature measurement is acquired before the braking process is initiated and the second temperature measurement is acquired after the braking process is terminated. The amount of work done by a brake during a braking process is also proportional to the area under the (speed×commanded brake force) power curve for the time interval during which brake force is applied. A long-term braking system health factor is derived from the ratio of these values. This term will be monitored over time and changes in the value relate to changes in the braking system, such as brake wear.

In accordance with one proposed implementation of the first brake health monitoring algorithm for monitoring the health of a single brake, the approximately proportional relationship of the amount of work done by a brake to slow a vehicle (Work$_{MEASURED}$) and the measured change in temperature from before (Temp$_{BEFORE}$) and after (Temp$_{AFTER}$) the braking process can be expressed as follows:

$$\text{Work}_{MEASURED} \propto (\text{Temp}_{AFTER} - \text{Temp}_{BEFORE})$$

The expected amount of work done by a brake to reduce vehicle velocity can be calculated to within a proportionality factor WOW. The WOW factor is (0, 1) and merely indicates that the vehicle (e.g., an aircraft) must be on the ground (i.e., weight on wheels) for the calculation. The calculated amount of work done can be expressed as follows:

$$\text{Work}_{CALCULATED} \propto \text{Sum over time}(F_{NORMAL} \times \text{Speed} \times WOW)$$

where $F_{NORMAL}$ is the surface normal force and Speed is the ground speed of the vehicle. (The rotational rate of the wheel can be deduced from the groundspeed and wheel size, i.e., the wheel rotation rate is proportional to groundspeed. Because the first algorithm uses proportionality factorization, the exact size of the wheel does not need to be taken into account.)

The first brake health monitoring algorithm treats changes in the ratio of the two terms Work$_{CALCULATED}$ and Work$_{MEASURED}$ as a long-term brake health indicator. For a single brake and a single landing, this health indicator can be expressed as follows:

$$\text{Single Brake Health Indicator} = \text{Work}_{CALCULATED}/\text{Work}_{MEASURED}$$

Monitoring this Single Brake Health Indicator over time can provide insight into changing brake health. In theory, normal force is proportional to tangential force. The work done on the brake pad is proportional to the product of tangential force and wheel rotation rate. All complex machines such as vehicles have a failure modes and effects analysis (FMEA) performed which identifies potential failures and effects. For a braking system, there are failure modes which may reduce the actual normal force being applied and modes which may increase the force being applied. Any of the modes will affect the ratio of Work$_{CALCULATED}$ to Work$_{MEASURED}$. For example, a failure mode which causes the brake tangential force to be stronger than what is measured will cause the Work$_{CALCULATED}$ to be less than what was actually performed. The Work$_{MEASURED}$, measured by thermal increase, will still be related to the actual work performed. Thus the ratio Work$_{CALCULATED}$/Work$_{MEASURED}$ will be less than what occurs for a healthy system.

In accordance with one monitoring method, a respective set of sensor and command data can be collected over time (i.e., after multiple landings) for each brake on an aircraft. Based on the collected sensor and command data, a respective value of the above-described Single Brake Health Indicator will be calculated for each data set and stored in a database. This stored data can then be selectively processed to determine respective ranges of acceptable values of the Single Brake Health Indicator for each brake. Each range of acceptable values is preferably bounded by an upper threshold value and/or a lower threshold value.

Once a range of expected (i.e., acceptable) values has been established for the Single Brake Health Indicator, that standard can be compared to new values acquired during subsequent landings. During each subsequent landing, further sensor and command data will be collected. After the landing, a current value of the Single Brake Health Indicator will be calculated for each brake. A current value outside the corresponding range of acceptable values will be flagged for further investigation, which investigation may include inspection of the possibly sub-standard brake by maintenance personnel. Based on the results of the investigation, the responsible maintenance manager may determine that the brake under investigation should be replaced or repaired.

In accordance with one method that uses the first brake health monitoring algorithm, the long-term health of a single brake is determined by relating a calculated braking energy (i.e., the brake input energy) to a measured thermal energy (i.e., the brake output energy). More specifically, execution of the first brake health monitoring algorithm comprises calculating the brake input energy, calculating the brake output energy and then calculating the ratio of the brake input energy to the brake output energy. This method utilizes real system measured parameters related to the amount of thermal energy generated during a braking process. The work done by a brake to slow an aircraft in converted into thermal energy through the brake frictional force. The amount of work done by a brake is approximately proportional to the measured change in temperature during the braking process. More specifically, the amount of work done by a brake is approximately proportional to the difference between first and second temperature measurements, wherein the first temperature measurement is acquired before the braking process is initiated and the second temperature measurement is acquired after the braking process is terminated. The amount of work done by a brake during a braking process is also proportional to the area under the (speed times commanded brake force) power curve for the time interval during which brake force is applied. A long-term braking system health factor is derived from the ratio of these values. This term will be monitored over time and any changes in value relate to changes in the braking system, such as increased brake wear or other damage.

In accordance with an alternative embodiment of the first brake health monitoring algorithm, the brake condition parameter is measured brake force, and the amount of brake output energy during application of brake forces is estimated by calculating a sum over time of a product of the measured groundspeed of the vehicle and the measured brake force during application of brake forces. As disclosed above, the applied brake force is measured by the brake force sensor 6 (see FIG. 2).

In accordance with one proposed implementation of the second brake health monitoring algorithm, the long-term brake health for a pair of brakes arranged to apply respective brake forces in a symmetrical manner is determined using only changes in brake temperature. This method uses real system measured parameters related to thermal energy generated during a braking process. For example, this method would compare axial pairs and inter-truck and intra-truck brakes. The amount of work done by both brakes during the braking process in a symmetric force application system will be equal. Temperature change is directly related to the work being done. The measured change in temperature in one brake (e.g., TempBrake1$_{AFTER}$−TempBrake1$_{BEFORE}$) should be proportional to the measured change in temperature in the other brake (e.g., TempBrake2$_{AFTER}$−TempBrake2$_{BEFORE}$), where the subscripts "$_{BEFORE}$" and "$_{AFTER}$" indicate the temperatures before and after the braking process for each brake. The respective temperature changes would be equal if the structure from brake surface to measurement location were the same. However, differences in measurement location and structure can create different energy inputs to thermal difference measurements. The result is that the measured thermal difference before and after braking in one brake should be proportional to the measured thermal difference in the other brake. This method provides a technique for detecting degradation of one brake relative to the other brake. It will fail if both brakes degrade (e.g., wear) in a similar manner.

Thus the second brake health monitoring algorithm applies a Dual Brake Health Indicator which is equal to the ratio of the change in temperature of a first brake (i.e., Brake 1) and the change in temperature of a second brake (i.e., Brake 2) during brake application during the same landing. More specifically, the second brake health monitoring algorithm calculates the value of that Dual Brake Health Indicator using the following equation:

$$\text{Dual Brake Health Indicator} = \frac{(\text{Temp Brake } 1_{AFTER} - \text{Temp Brake } 1_{BEFORE})}{(\text{Temp Brake } 2_{AFTER} - \text{Temp Brake } 2_{BEFORE})}$$

Monitoring this Dual Brake Health Indicator over time can provide insight into changing brake health. In accordance with one monitoring method, respective sets of brake temperature data can be collected over time (i.e., after multiple landings) for each pair of brakes on an aircraft that apply brake forces symmetrically. Based on the collected temperature data, a respective value of the above-described Dual Brake Health Indicator will be calculated for each data set and stored in a database. This stored data can then be selectively processed to determine respective ranges of acceptable values of the Dual Brake Health Indicator for each pair of associated brakes. Each range of acceptable values is preferably bounded by an upper threshold value and/or a lower threshold value.

Once a range of expected (i.e., acceptable) values has been established for the Dual Brake Health Indicator, that standard can be compared to new values acquired during subsequent landings. During each subsequent landing, further temperature data for the same pairs of brakes will be collected. After each landing, a current value of the Dual Brake Health Indicator will be calculated for each pair of associated brakes. A current value outside the corresponding range of acceptable values is treated as an indication that one of the pair of associated brakes is possibly sub-standard. Accordingly, that pair of associated brakes will be flagged for further investigation, which investigation may include inspection of the brakes by maintenance personnel. Based on the results of the investigation, the responsible maintenance manager may determine that one of the brakes should be replaced or repaired. Thus the second brake health monitoring algorithm relies on the comparison of historical brake temperature data and brake temperature data acquired during the most recent landing.

In accordance with alternative embodiments, a third brake health monitoring algorithm which filters landing data sets to be more similar and therefore comparable over time is employed. The third brake health monitoring algorithm is designed to be used in conjunction with either the first or second brake health monitoring algorithm.

More specifically, the third brake health monitoring algorithm can be used to refine other methods for brake health monitoring by adjusting for potential confounders, i.e. other factors that also affect temperature. The ideal goal is to conclude that a high temperature is caused by a fault or wear. But the challenge is that other factors also affect temperature. Temperatures from different landings may not be comparable. A high temperature observed in one flight may be due to other factors and not due to a fault.

The ideal goal is only possible after removing the effect of other factors (confounders) that also affect temperature. The procedure involves two steps: (1) first estimate what the temperature would have been if the system were healthy—based on these other factors, (2) then remove the effect of these other factors by subtracting estimated from observed temperature.

The estimation can be accomplished in two ways, depending on the number of confounders. If the number is modest, through matching; if the number is higher, through regression. Only healthy examples are included in the pool of matches, and in the training set to estimate the regression.

If the goal is to estimate wear, then choose the healthy examples at a fixed point of wear (early in life, possibly after a suitable break-in period). Otherwise, if detecting a fault (and not wear) is of primary interest, then include as a candidate confounder an indicator for wear such as brake age or usage. Select confounders through subject matter expertise, and also by assessing which candidates help to better predict temperature.

Examples of potential confounders include both (1) single time measurements (which vary little over the time of a landing), and (2) time series measurements whose profile over a flight can be important. Examples of single time measurements include outside air temperature, altitude, time to taxi, length of runway, vertical acceleration at landing (to determine hard landing). Examples of time series measurement include longitudinal and lateral accelerations, and braking time sequences such as brake force, ground speed, auto brake commands, thrust reverser, and anti-skid. Finally, brake manufacturers differ in their way of measuring brake force and comparing with commanded force. This can affect variability of temperatures. Therefore, brake manufacturer should also be a candidate confounder.

For regression, assume temperature T is a function of the confounders X:

$$T=f(X)$$

Estimate using a training set of healthy examples. Flexible nonparametric techniques such as tree ensembles (boosting or random forests) generally work better than linear models.

An important step is assess "covariate balance": is the training set representative of future data? It is especially important not to extrapolate outside the range of each confounder used in the training set. But it is also desirable that the distributions of the confounders look similar for the training and deployed data sets.

Fitting the model is typically an iterative process. When completed, the model is deployed in the following way. For a new observation, estimate temperature using the fitted regression model and observed confounders. Calculate the residuals: the observed minus the estimated/predicted. This is the difference between observed and what would have been observed if the system were healthy. This controls/normalizes for other factors that affect temperature. If done correctly, the residual is due to fault/wear. A small residual indicates a healthy system, whereas a large residual indicates a fault/wear.

Matching on confounders is a similar process, and is appropriate for a low number of confounders, or to help choose confounders for the regression approach. Healthy examples are used, and this set should have a distribution of confounders similar to what will be encountered when the system is deployed. The key difference is that instead of fitting a regression model, a distance metric is used to define similarity of matches. A pool of healthy examples is maintained in a database.

For a new observation, the chosen distance metric is used to find one or more examples in the database that have the most similar confounding variables. For nearest neighbor matching (a single closest match), the corresponding temperature is used as an estimate of what the temperature would have been if healthy, based on the confounding variables. As in the regression approach, the difference from observed is the effect due to a fault/wear.

Figures 3, 3A:
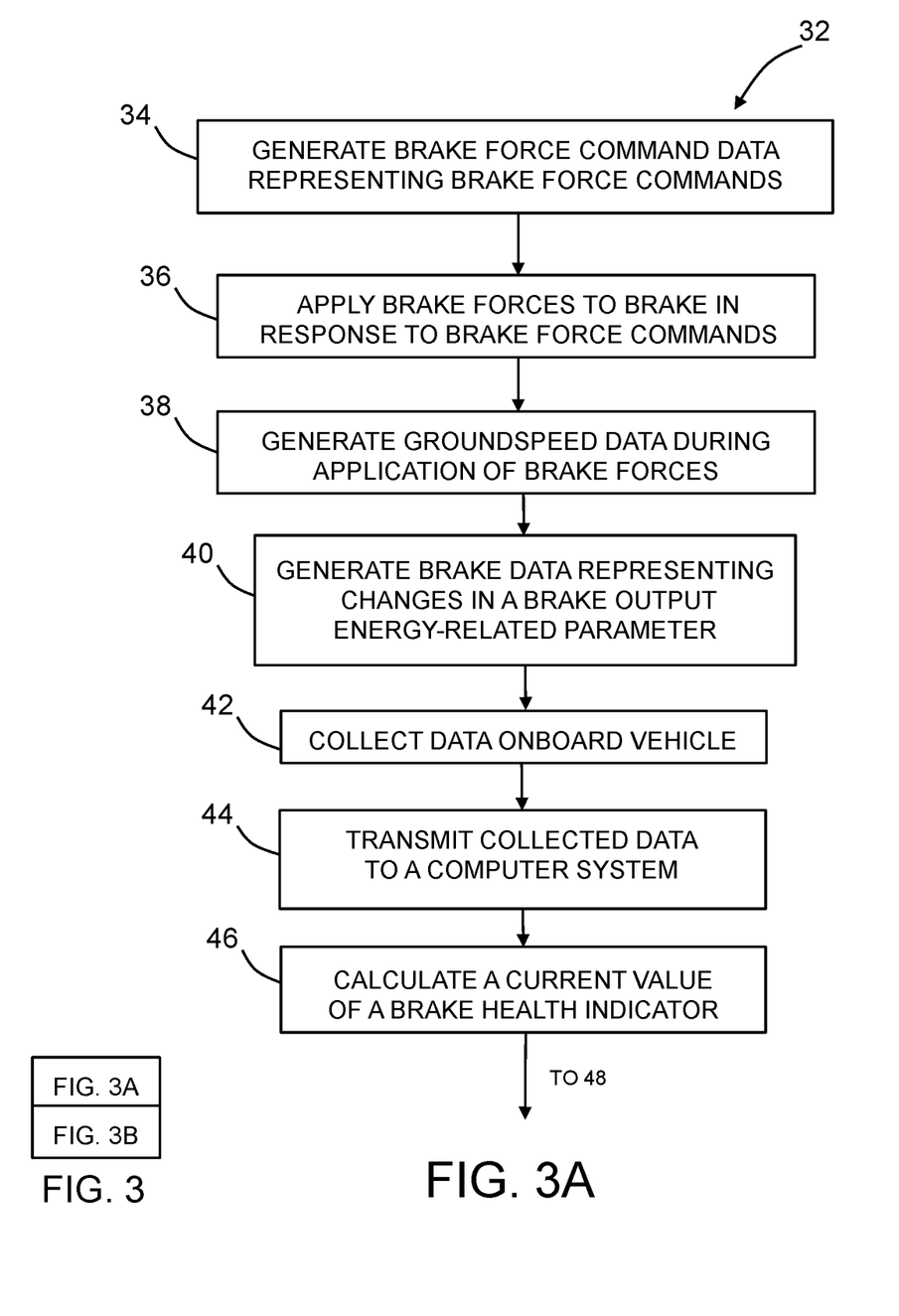
Figure 3B:
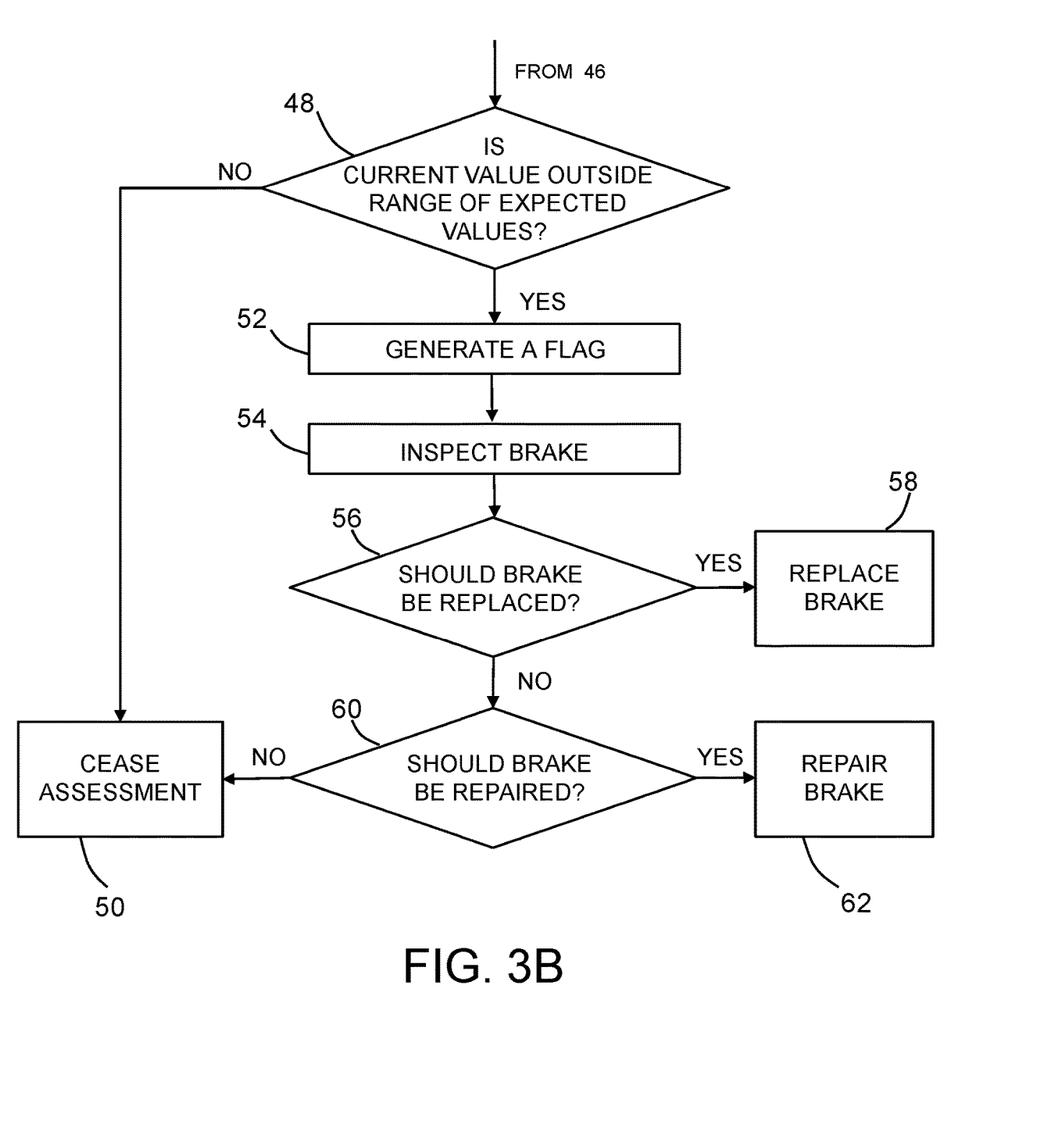

FIG. 3 indicates the relationship between FIGS. 3A and 3B, which figures (in conjunction) form a flowchart identifying steps of a process 30 for monitoring the health of brakes on a vehicle in accordance with one advantageous embodiment that employs the first brake health monitoring algorithm disclosed above.

Referring to FIG. 3A, the process 32 begins when the brake system control unit generates brake force command data representing brake force commands (step 34). Brake forces are applied to the brake in response to the brake force commands (step 36). In addition, an aircraft system generates groundspeed data representing measured groundspeeds of the vehicle during application of brake forces (step 38). Also, brake data representing brake data representing measurements of a condition (e.g., temperature or brake force) of the brake during application of brake forces is generated (step 40). The brake force command data, groundspeed data and brake data are collected onboard the vehicle (step 42). Thereafter the collected data is transmitted to a ground-based computer system (step 44). The ground-based computer system is configured to perform the following steps: calculate a current value of a brake health indicator that is a ratio of a brake input energy to a brake output energy based on the collected data (step 46 in FIG. 3A); and determine whether the current value of the brake health indicator is outside a range of expected values or not (step 48 in FIG. 3B).

Referring to FIG. 3B, the ground-based computer system is further configured to cease its brake health assessment process (step 50) if a determination is made in step 48 that the current value of the brake health indicator is not outside the range of expected values. Conversely, the ground-based computer system is further configured to generate a flag (step 52) in response to a determination in step 48 that the current value of the brake health indicator is outside the range of expected values.

An inspection of the brake is performed following generation of the flag (step 54). A determination is then made (based on the inspection results) whether the brake should be replaced or not (step 56). If it is determined that the brake should be replaced, then appropriate steps are taken to replace the brake (step 58). If the brake should not be replaced, a further determination (again based on the inspection results) is made whether the brake should be repaired or not (step 60). If it is determined that the brake should be repaired, not replaced, then appropriate steps are taken to repair the brake (step 62). If it is determined that the brake should be neither replaced nor repaired, then the ground-based computer system will cease its brake health assessment process (step 50).

Figures 4, 4A:
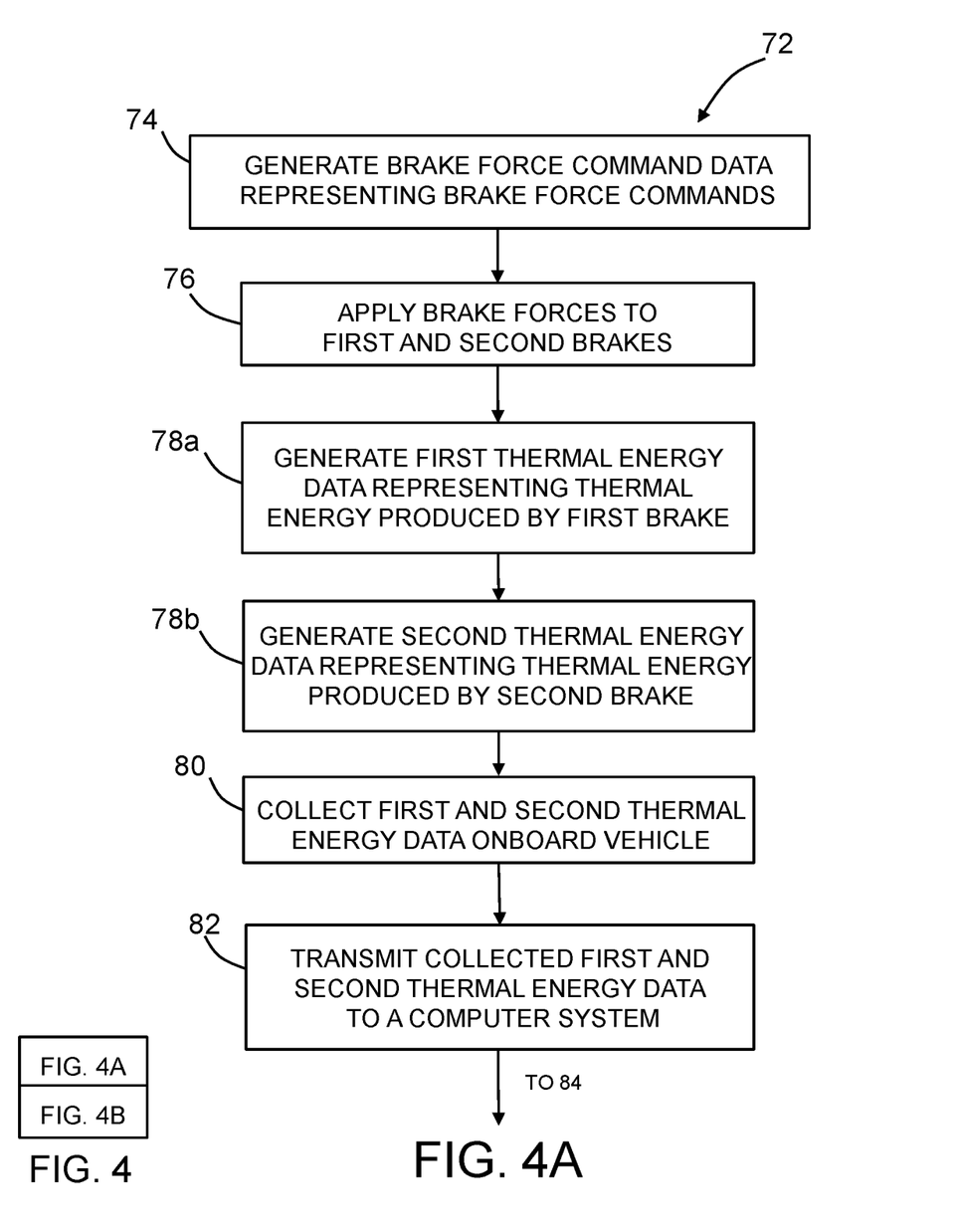
Figure 4B:
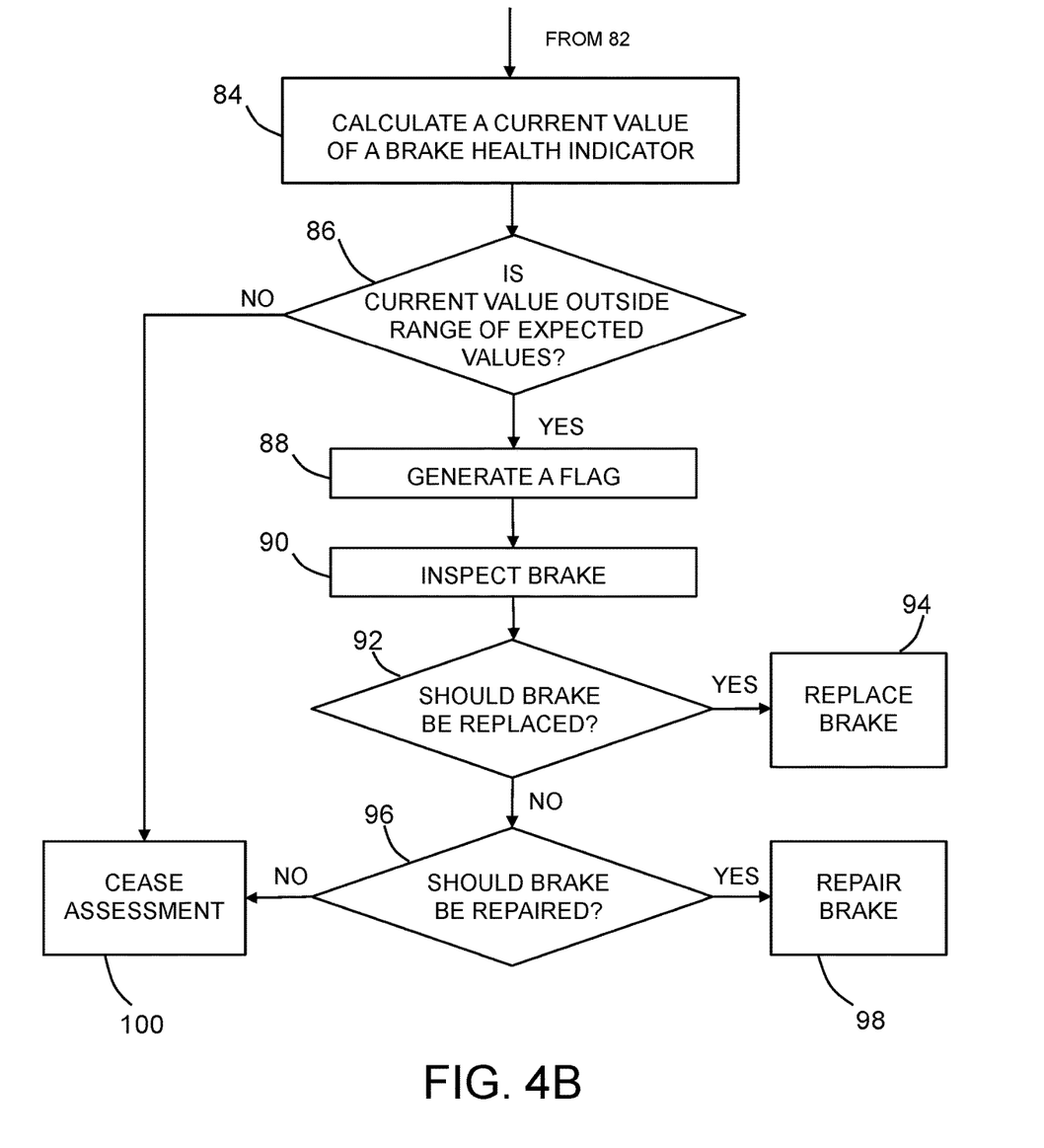

FIG. 4 indicates the relationship between FIGS. 4A and 4B, which figures in conjunction form a flowchart identifying steps of a process 70 for monitoring the health of brakes on a vehicle in accordance with another advantageous embodiment that employs the second brake health monitoring algorithm disclosed above.

Referring to FIG. 4A, the process 72 begins when the brake system control unit generates brake force command data representing brake force commands (step 74). Brake forces are applied to first and second brakes in response to the brake force commands (step 76). First thermal energy data representing an amount of thermal energy produced by the first brake during application of brake forces is generated (step 78a). Similarly, second thermal energy data representing an amount of thermal energy produced by the second brake during application of brake forces is generated (step 78b). The brake force command data, groundspeed data first and second thermal energy data are collected onboard the vehicle (step 80). Thereafter the collected data is transmitted to a ground-based computer system (step 82).

Referring to FIG. 4B, the ground-based computer system is configured to perform the following steps: calculate a current value of a brake health indicator that is a ratio of the amounts of thermal energy respectively produced by the first and second brakes during application of brake forces (step 84); and determine whether the current value of the brake health indicator is outside a range of expected values or not (step 86). The ground-based computer system is further configured to cease its brake health assessment process (step 100) if a determination is made in step 86 that the current value of the brake health indicator is not outside the range of expected values. Conversely, the ground-based computer system is further configured to generate a flag (step 88) in response to a determination in step 86 that the current value of the brake health indicator is outside the range of expected values.

An inspection of the brakes is performed following generation of the flag (step 90). A determination is then made (based on the inspection results) whether either of the brakes should be replaced or not (step 92). If it is determined that one of the brakes should be replaced, then appropriate steps are taken to replace that brake (step 94). If neither brake should be replaced, a further determination (again based on the inspection results) is made whether one of the brakes should be repaired or not (step 96). If it is determined that one of the brakes should be repaired, then appropriate steps are taken to repair that brake (step 98). If it is determined that neither brake should be replaced nor repaired, then the ground-based computer system will cease its brake health assessment process (step 100).

While systems and methods for monitoring the health of brakes have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The embodiments disclosed above use one or more computing systems. As used in the claims, the term "computing system" comprises one or more of the following: a computer, a processor, a controller, a central processing unit, a microcontroller, a reduced instruction set computer processor, an ASIC, a programmable logic circuit, an FPGA, a digital signal processor, and/or any other circuit or processing device capable of executing the functions described herein. For example, a computing system may comprise multiple microcontrollers or multiple processors which communicate via a network or bus. As used herein, the terms "computer" and "processor" both refer to devices having a processing unit (e.g., a central processing unit) and some form of memory (i.e., computer-readable medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for monitoring health of a brake on a landing gear of an aircraft, comprising:
    (a) generating brake force command data representing brake force commands;
    (b) applying brake forces to the brake in response to the brake force commands;
    (c) generating groundspeed data representing measurements of groundspeed of the aircraft during application of brake forces;
    (d) generating first brake temperature data representing a first brake temperature of the brake at a time before application of brake forces;
    (e) generating second brake temperature data representing a second brake temperature of the brake at a time after application of brake forces;
    (f) collecting the brake force command data, groundspeed data, and first and second brake temperature data onboard the aircraft;
    (g) transmitting the collected data to a ground-based brake health assessment computer system;
    (h) calculating a brake input energy value by integrating a product of measured groundspeed of the aircraft and commanded brake force during the application of brake forces during a time interval;
    (i) calculating a brake output energy value by subtracting the first brake temperature from the second brake temperature;
    (j) calculating a ratio of brake input energy to brake output energy by dividing the brake output energy value by the brake input energy value;
    (k) determining whether the ratio of brake input energy to brake output energy is within a range of predetermined values or not,
    wherein steps (a) through (q) are performed onboard the aircraft; and
wherein steps (h) through (k) are performed by the ground-based brake health assessment computer system.

2. The method as recited in claim 1, further comprising generating a flag in response to a determination in step (k) that the ratio of brake input energy to brake output energy is outside the range of the predetermined values.

3. The method as recited in claim 2, further comprising performing an inspection of the brake following generating the flag.

4. The method as recited in claim 3, further comprising repairing the brake.

5. The method as recited in claim 3, further comprising replacing the brake.

6. The method as recited in claim 1, further comprising comparing the second brake temperature data for the brake with selected brake temperature data collected from the brake during other landings under similar conditions.

7. The method as recited in claim 1, wherein the predetermined values are historical values of the ratio of brake input energy to brake output energy.

8. A method for monitoring health of a brake on a landing gear of an aircraft, comprising:
    (a) applying brake forces to the brake;
    (b) measuring the brake forces during application of brake forces using a brake force sensor, thereby generating brake force measurement data;
    (c) generating groundspeed data representing measurements of groundspeed of the aircraft during application of brake forces;
    (d) generating first brake temperature data representing a first brake temperature of the brake at a time before application of brake forces;
    (e) generating second brake temperature data representing a second brake temperature of the brake at a time after application of brake forces;
    (f) collecting the brake force measurement data, the groundspeed data, and the first and second brake temperature data onboard the aircraft;
    (g) transmitting the collected data to a ground based brake health assessment computer system;
    (h) calculating a brake input energy value by integrating a product of the measurements of groundspeed of the aircraft and the brake force measurement data during application of brake forces during a time interval;
    (i) calculating a brake output energy value by subtracting the first brake temperature from the second brake temperature;
    (j) calculating a ratio of brake input energy to brake output energy by dividing the brake output energy value by the brake input energy value;
    (k) determining whether the ratio of brake input energy to brake output energy is within a range of predetermined values or not,
    wherein steps (a) through (a) are performed onboard the aircraft; and
    wherein steps (h) through (k) are performed by the ground based brake health assessment computer system.

9. The method as recited in claim 8, further comprising generating a flag in response to a determination in step (k) that the ratio of brake input energy to brake output energy is outside the range of the predetermined values.

10. The method as recited in claim 9, further comprising performing an inspection of the brake following generating the flag.

11. The method as recited in claim 10, further comprising repairing the brake.

12. The method as recited in claim 10, further comprising replacing the brake.

13. The method as recited in claim 8, further comprising comparing the second brake temperature data for the brake with selected brake temperature data collected from the brake during other landings under similar conditions.

14. The method as recited in claim 8, wherein the predetermined values are historical values of the ratio of brake input energy to the brake output energy.

* * * * *